(12) United States Patent
Feight

(10) Patent No.: US 7,382,272 B2
(45) Date of Patent: Jun. 3, 2008

(54) SYSTEM, A TOOL AND METHOD FOR COMMUNICATING WITH A FAULTED CIRCUIT INDICATOR USING A REMOTE DISPLAY

(75) Inventor: Laurence V. Feight, Island Lake, IL (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 227 days.

(21) Appl. No.: 11/253,423

(22) Filed: Oct. 19, 2005

(65) Prior Publication Data

US 2007/0085693 A1    Apr. 19, 2007

(51) Int. Cl.
G08B 5/00 (2006.01)
G08B 21/00 (2006.01)
H04B 10/00 (2006.01)
G01R 31/00 (2006.01)

(52) U.S. Cl. .................. 340/815.4; 340/531; 340/635; 340/3.43; 340/650; 340/657; 340/825.72; 398/17; 398/106; 307/117; 324/500; 324/133; 200/61.02

(58) Field of Classification Search .............. 340/815.4
See application file for complete search history.

(56) References Cited

U.S. PATENT DOCUMENTS

| | | | |
|---|---|---|---|
| 4,456,873 A | 6/1984 | Schweitzer | |
| 4,751,605 A * | 6/1988 | Mertz et al. ............... | 361/91.1 |
| 5,008,651 A | 4/1991 | Schweitzer | |
| 5,345,230 A * | 9/1994 | Jackson et al. ............ | 340/3.51 |
| 5,680,052 A | 10/1997 | Tomari et al. | |
| 5,943,201 A * | 8/1999 | Walker et al. ................ | 361/64 |
| 5,959,537 A | 9/1999 | Banting | |
| 6,016,105 A | 1/2000 | Schweitzer | |
| 6,133,723 A | 10/2000 | Feight | |
| 6,133,724 A | 10/2000 | Schweitzer | |
| 6,433,698 B1 | 8/2002 | Schweitzer | |
| 6,449,741 B1 | 9/2002 | Organ et al. | |
| 6,479,981 B2 | 11/2002 | Schweitzer | |
| 6,675,339 B1 | 1/2004 | Lanier et al. | |
| 6,734,662 B1 | 5/2004 | Fenske | |
| 6,822,576 B1 | 11/2004 | Feight | |
| 6,894,478 B1 | 5/2005 | Fenske | |
| 7,023,691 B1 | 4/2006 | Feight | |

(Continued)

FOREIGN PATENT DOCUMENTS

GB    2381875    5/2003

*Primary Examiner*—Donnie L. Crosland
(74) *Attorney, Agent, or Firm*—Cook, Alex, McFarron, Manzo, Cummings & Mehler, Ltd.

(57) ABSTRACT

Provided is a system, a tool and a method for communicating with a faulted circuit indicator (FCI), the faulted circuit indicator including a detection circuit for monitoring an electrical conductor of a power system. The system includes a remote display mounted in a wall of an enclosure and visible from outside of the enclosure and a first light emitting diode associated with the remote display. The first light emitting diode generates an optical FCI status signal in response to an occurrence of a fault in the electrical conductor. The system also includes a first microcontroller operatively coupled to the remote display and the detection circuit, and a handheld user command tool adapted to optically couple with the remote display. The handheld user command tool is also adapted to generate an optical serial communication. The optical serial communication provides data and commands for operation of the faulted circuit indicator.

37 Claims, 5 Drawing Sheets

U.S. PATENT DOCUMENTS

| | | |
|---|---|---|
| 2002/0149822 A1 | 10/2002 | Stroud |
| 2003/0058097 A1* | 3/2003 | Saltzstein et al. ........... 340/531 |
| 2003/0167345 A1 | 9/2003 | Knight |
| 2003/0170033 A1* | 9/2003 | Peterson et al. ............ 398/172 |
| 2003/0214391 A1* | 11/2003 | Kondo et al. ............ 340/425.5 |

* cited by examiner

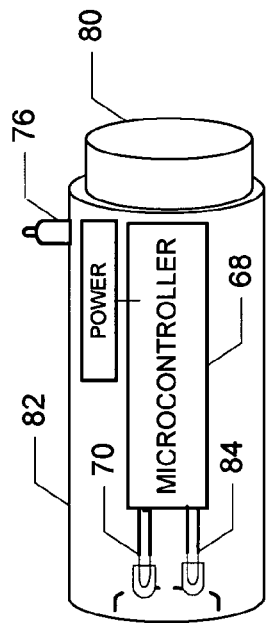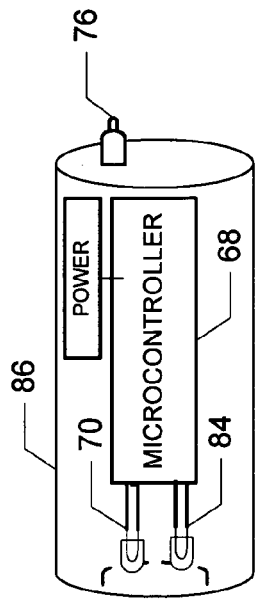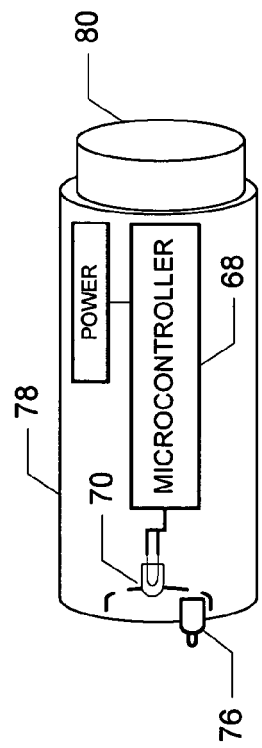

SYSTEM, A TOOL AND METHOD FOR COMMUNICATING WITH A FAULTED CIRCUIT INDICATOR USING A REMOTE DISPLAY

RELATED APPLICATIONS

None

BACKGROUND OF THE INVENTION

1. Field of the Invention

The invention relates generally to the monitoring, servicing, and maintaining of underground electrical power lines and more specifically to a system, a tool and a method for communicating with a faulted circuit indicator using a remote display.

2. Description of Related Art

Faulted Circuit Indicators (FCIs) indicate the occurrence of a fault current in a monitored electrical conductor such as a transmission line. An FCI typically includes a housing and a number of FCI elements. The FCI elements may include a power supply such as a battery, a "remote" display for indicating when a fault in a monitored electrical conductor has occurred, a detection circuit such as a reed switch or split-core current transformer for sensing the current in the monitored electrical conductor and for providing a signal that is related to the current in the monitored conductor, and an FCI microcontroller for controlling operation of the FCI. In some cases however, the FCI may not include an FCI microcontroller.

Various types of self-powered FCIs have been constructed for detecting electrical faults in electrical conductors and the like. For example, a clamp-on type FCI clamps directly over an electrical conductor and derives its operating power from inductive and/or capacitive coupling to the monitored electrical conductor. A test point type FCIs is mounted over a test point on an electrical conductor of the power system and derives its operating power from capacitive coupling to the monitored electrical conductor. For underground electrical conductors, FCIs are generally used at padmounted distribution transformers, subsurface load centers or junction sectionalizing points (e.g., one section of an electrical conductor mates with a connector that distributes power to multiple electrical conductors). For overhead electrical conductors, FCIs are generally used at main line feeders or mid-feeder disconnects.

An FCI monitoring the status of an associated electrical conductor is typically housed in a weather-proof enclosure, either pole-mounted for overhead electrical conductors or surface-level padmounted for underground electrical conductors. Typically, the remote display (or translucent window operatively coupled to the remote display) is strategically mounted on an outside wall of the enclosure to enable easy viewing by utility personnel. Accordingly, when the enclosure is opened, utility personnel are able to access the FCI(s) and associated sections of the electrical conductor housed in the enclosure. When the enclosure is closed, the FCI(s) and associated electrical conductor sections are protected from external environmental conditions while only allowing utility personnel to view a fault condition from outside the enclosure via the remote display.

During operation of a microcontroller-based FCI, the FCI microcontroller receives the monitored current signal from the detection circuit and, based on that monitored current signal, determines the current in the electrical conductor. If the current exceeds a trip threshold setting value of the FCI, the FCI microcontroller determines that a fault condition has occurred and causes a fault condition signal to be provided to utility personnel via the remote display.

As noted above, placement of the remote display on an outside wall of the enclosure reduces the need for specially trained utility personnel to access the interior of the padmounted or the pole-mounted enclosure to determine electrical conductor status. Such a remote display may incorporate one of any number of suitable display technologies to provide an indication of electrical conductor status to the utility personnel. For example, the remote display may incorporate a mechanical target (indicator), a magnetic element, a flashing light emitting diode (LED), or a combination of technologies to display electrical conductor status to utility personnel located outside of the enclosure.

Some FCIs are designed to automatically reset at the end of a predetermined time period (e.g., eight hours) that begins when a fault condition is detected in the monitored electrical conductor. During that predetermined time period however, demand on the FCI power supply increases to enable the operation of the remote display. As a result, manual resetting of the FCI prior to expiration of the predetermined time period is often desirable. In addition to resetting the remote display, manual resetting provides an indication to the FCI microcontroller to cause it to terminate a timer countdown associated with the predetermined time period (e.g., terminates the eight hour countdown during which time an LED flashes), and thus extends the life of the FCI power supply.

For best performance, testing and maintenance activities are routinely excecuted on the FCI. Further, in some cases, the testing and maintenance activities are mandated by a number of regulatory commissions. Obviously, the time and cost associated with FCI resetting, testing and maintenance activities can be reduced if they can be performed without requiring specially trained utility personnel to open the enclosures.

To reduce the costs associated with FCI resetting, testing and other maintenance activities, U.S. Pat. No. 6,894,478 ('478), issued May 17, 2005, to Fenske, entitled "Fault Indicator with Automatically Configured Trip Settings", discloses an FCI having a remote display configured as a "beacon bolt" mounted to an outside wall of an enclosure. The beacon bolt includes a reed switch and an LED housed in a bolt that requires a ⅝" remote display mounting hole in the enclosure wall. Illumination and non-illumination of the LED provides the visual indication of the status of the conductor monitored by the associated FCI. The reed switch enables set/reset and test activities to be performed by the utility personnel via a magnetic test tool. The utility industry however, is migrating to a smaller remote display mounting hole (e.g., ⁷⁄₁₆") due to the increased ease of drilling the remote display mounting hole in the field. As a result, the ⅝" remote display mounting hole required by the beacon bolt of the '478 patent has rendered use of the beacon bolt, with its reed switch, less desirable due to both its physical size and increased difficulty driving magnetic flux from the magnetic test tool through the beacon bolts.

BRIEF SUMMARY OF THE INVENTION

In general, the system, the tool and the method disclosed herein utilizes an LED, not only to display FCI monitored conductor status, but also to enable FCI resetting, testing and other maintenance activities by utility personnel located outside of its associated housing. Such FCI testing and maintenance activities include, among other things, checking FCI power supply status, enabling/disabling of FCI features and settings to accommodate power system changes such as load growth, protective system configuration changes (e.g., protective relay settings change), and changing FCI configurations such as desired display time.

The system and method utilizes an LED in a bolt-shaped housing, both to receive and transmit information, while accommodating today's smaller remote display mounting hole. The bolt-shaped housing may be constructed using one of any number of suitable techniques to enable the easy viewing of an optical signal generated by the LED. For example, the bolt-shaped housing may be constructed using a thermoplastic remote display lens or it may be constructed using a metal injection molded (MIM) stainless steel core with a polycarbonate overmold. When the LED is not transmitting its optical signal (e.g., a flashing indication), setting/resetting and servicing activities are communicated by utility personnel using a handheld user command tool via exploitation of the LED's photovoltaic properties where optical serial communication signals from the handheld user command tool are converted into into a serial voltage signal. As the optical serial communication is varied, so too is the serial voltage signal generated by the LED.

In general, an optical serial communication transmitted from the user command tool to the LED, causes the LED to generate a serial voltage signal proportional to the received optical serial communication. When conditioned by an analog conditioning circuit, the serial voltage signal is converted to a serial digital signal suitable for use by the FCI microcontroller. When received by a serial communication port of the FCI microcontroller, the serial digital signal is utilized by the FCI microcontroller to perform any number of tasks including FCI resetting, testing and other maintenance activities, to name a few.

According to an embodiment, provided is a system for communicating with a faulted circuit indicator (FCI), the faulted circuit indicator including a detection circuit for monitoring an electrical conductor of a power system. The system includes a remote display mounted in a wall of an enclosure and visible from outside of the enclosure and a first light emitting diode associated with the remote display. The first light emitting diode generates an optical FCI status signal in response to an occurrence of a fault in the electrical conductor. The system also includes a first microcontroller operatively coupled to the remote display and the detection circuit, and a handheld user command tool adapted to optically couple with the remote display. The handheld user command tool is also adapted to generate and recieve optical serial communication. The optical serial communication provides data and commands for operation of the faulted circuit indicator. In addition to optically transmitting commands and data to the FCI, the handheld user tool may be used to receive data transmitted from the FCI. Data from the FCI could include information concerning the configuration of the FCI parameters or historic operational data such as the number of hours since the fault occurred.

According to another embodiment, provided is a user command tool adapted to optically couple with a remote display associated with a faulted circuit indicator monitoring an electrical conductor of a power system where the remote display includes a first light emitting diode and is mounted in a wall of an enclosure housing the faulted circuit indicator. The handheld user tool includes a housing having a first end adapted for optical coupling with the remote display, a second light emitting diode disposed at the first end of the housing, an on/off means, a power supply operatively coupled to the second light emitting diode, and a microcontroller operatively coupled to the power supply, the second light emitting diode and the on/off means. The microcontroller causes the second light emitting diode to generate an optical serial communication when an indication to enable transmission of the optical serial communication is received from the on/off means. The optical serial communication provides data and commands for operation of the faulted circuit indicator.

According to yet another embodiment, provided is a method for communicating with a faulted circuit indicator using a remote display operatively coupled to the faulted circuit indicator where the faulted circuit indicator is housed in an enclosure and includes a microcontroller. The remote display is associated with a first light emitting diode and is mounted in a wall of the enclosure. The method includes providing a handheld user command tool that includes a second light emitting diode. The handheld user command tool is adapted to optically couple with the remote display and generate an optical serial communication via the second light emitting diode. The optical serial communication provides at least one command for operation of the faulted circuit indicator. The method also includes detecting receipt of the optical serial communication, validating a serial digital signal where the serial digital signal is formed by digitizing the optical serial command, and executing the at least one command represented by the serial digital signal.

According to yet a further embodiment, provided is a method for communicating with a faulted circuit indicator using a remote display operatively coupled to the faulted circuit indicator where the faulted circuit indicator is housed in an enclosure and includes a microcontroller. The remote display is associated with a first light emitting diode and is mounted in a wall of the enclosure. The method includes providing a handheld user command tool that includes a second light emitting diode. The handheld user command tool is adapted to optically couple with the remote display and generate an optical serial communication via the second light emitting diode. The optical serial communication provides data for operation of the faulted circuit indicator. The method also includes detecting receipt of the optical serial communication, validating a serial digital signal where the serial digital signal formed by digitizing the optical serial command, and utilizing the data represented by the serial digital signal.

BRIEF DESCRIPTION OF THE DRAWINGS

FIG. 3 is a diagram of an exemplary user command tool that may be used to communicate with the faulted circuit indicator of FIG. 2, according to an embodiment of the invention.

FIG. 4 is a diagram of another exemplary user command tool that may be used to communicate with the faulted circuit indicator of FIG. 2, according to an embodiment of the invention.

FIG. 5 is a diagram of yet another exemplary user command tool that may be used to communicate with the faulted circuit indicator of FIG. 2, according to an embodiment of the invention.

DETAILED DESCRIPTION OF THE INVENTION

Implementation of the system, the tool and the method disclosed herein enables utility personnel outside of an enclosure housing the FCI to transmit optical serial communications affecting FCI operation via a remote display. The remote display is located within a display bolt mounted in an enclosure wall, thereby precluding a need to physically access the FCI located in the enclosure's interior. Unlike prior art remote displays having both a reed switch and an LED, and requiring a ⅝" display mounting hole, the remote display of the system and method disclosed herein includes only the LED and therefore requires a smaller remote display mounting hole. In addition, a user command tool of the system and method disclosed herein is capable of transmitting optical serial data and optical serial commands (i.e., optical serial communications) to the FCI via the LED, resulting in more robust capability to reset, test and maintain the FCI. Although discussed in terms of underground power lines, or underground electrical conductors, the embodiments disclosed herein are applicable to a wide range of configurations including, for example, overhead power lines mounted in enclosures.

Figure 1:
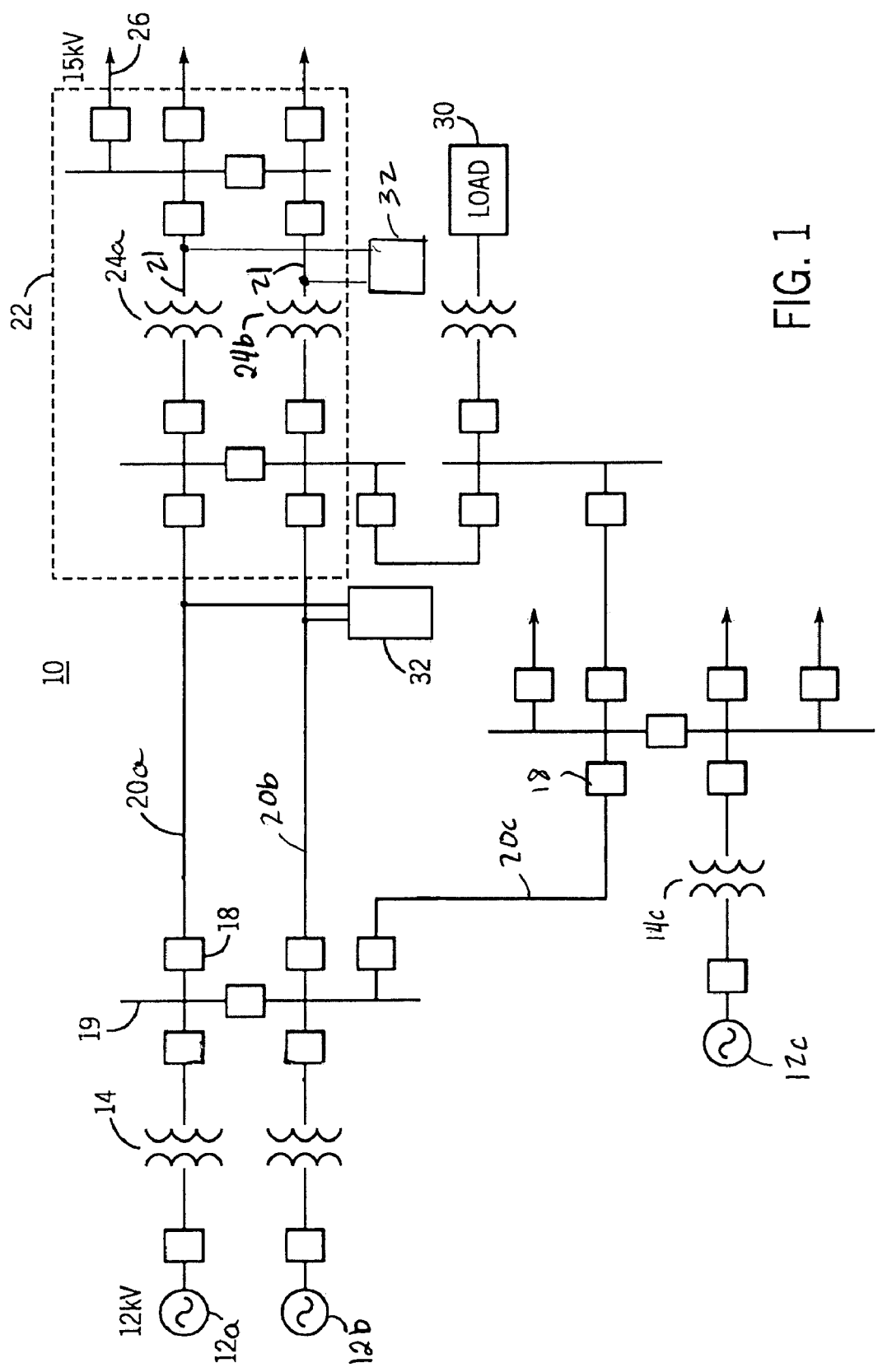
FIG. 1 is a schematic diagram of a power system that may be utilized in a typical metropolitan area.

FIG. 1 is a schematic diagram of a power system 10 that may be utilized in a typical metropolitan area. As illustrated in FIG. 1, the power system 10 includes, among other things, three generators 12a, 12b and 12c configured to generate three-phase sinusoidal waveforms, such as 12 kV sinusoidal waveforms. The power system 10 also includes three step-up power transformers 14a, 14b and 14c configured to increase the generated sinusoidal waveforms to a higher voltage such as 138 kV, a number of circuit breakers 18 and three transmission lines 20a, 20b and 20c interconnected via a first substation bus 19. At the end of the transmission lines 20a and 20b, a substation 22 includes two step-down power transformers 24a and 24b to transform the higher voltage sinusoidal waveforms to a lower voltage (e.g., 15 kV) suitable for distribution to various end users 26 (and loads 30).

The power system 10 also includes a number of pad-mounted enclosures 32 located at various points along underground distribution lines, for example, along underground distribution lines 21a and 21b to enable fault monitoring of an associated segment of the underground distribution line. The pad mounted enclosures are typically located at the end of one segment and the beginning of another segment of an underground distribution line. Accordingly, one or more FCIs are located in the pad-mounted enclosure 32 to assist the utility personnel in determining which segment in the distribution line needs servicing when a fault occurs.

Figure 2:
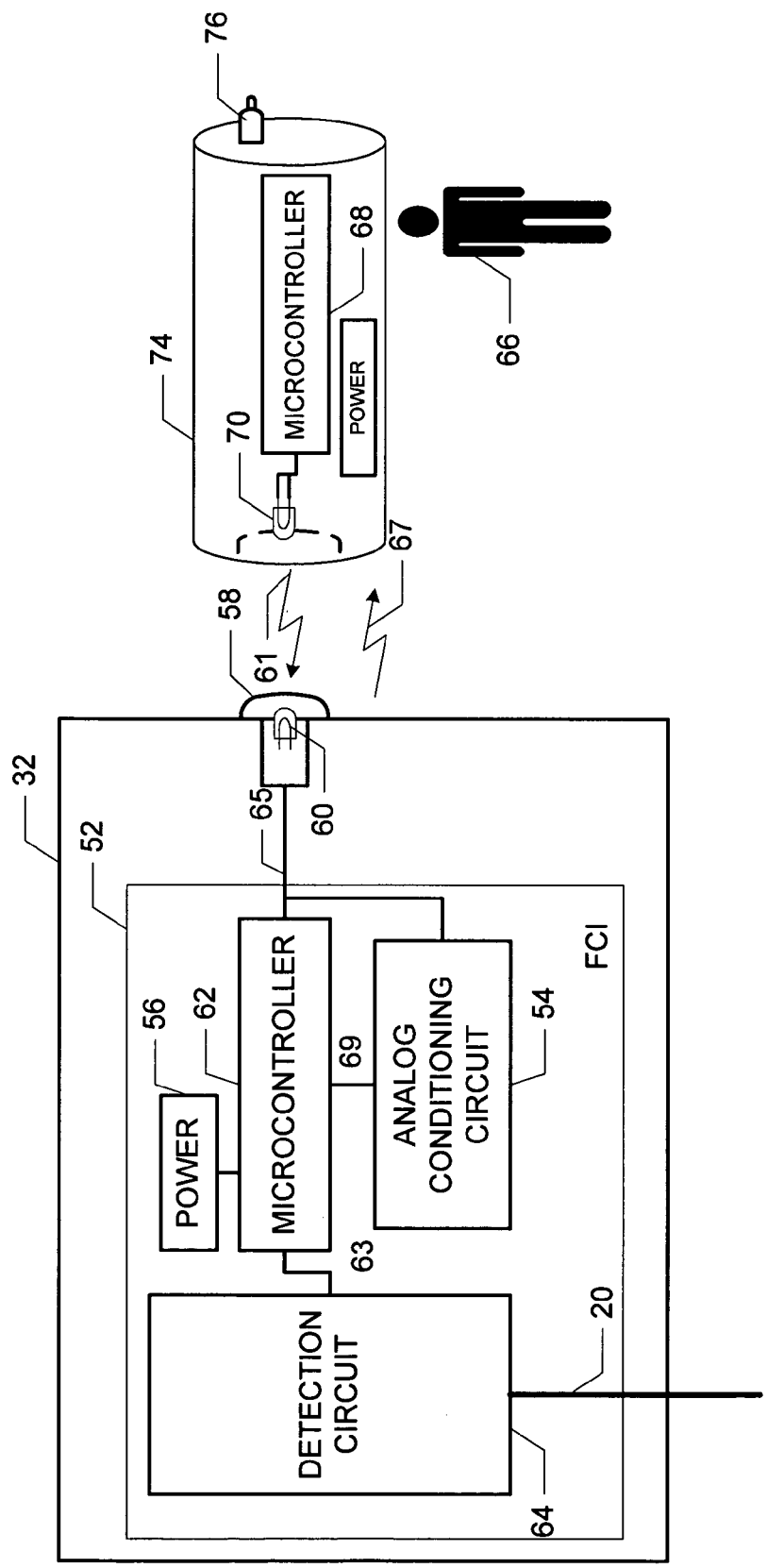
FIG. 2 is an exemplary system for communicating with a faulted circuit indicator located in an enclosure via a remote display, according to an embodiment of the invention.

FIG. 2 is an exemplary system 50 for communicating with a faulted circuit indicator 52 located in an enclosure via a remote display, according to an embodiment of the invention. As illustrated, the system 50 includes the enclosure 32 housing the FCI 52, an analog conditioning circuit 54, a power supply 56 and remote display bolt 58 including a first LED 60, all operatively coupled to an FCI microcontroller 62.

The remote display bolt 58 is preferably a bolt designed to fit into a smaller diameter hole, such as a ⁷⁄₁₆" hole, in a suitable wall of the enclosure 32. Construction of the remote display bolt 58 may include the use of a metal injection molded stainless steel core with a polycarbonate overmold designed to improve shear force tolerance of the remote display bolt 58 housing and to allow use of standard sealing washers for corrosion prevention.

The FCI 52 further includes a detection circuit 64 such as a split core current transformer, operatively coupled to the FCI microcontroller 62 and strategically located to monitor a segment of an electrical conductor such as a segment of a distribution line of the power system 10. Although the FCI elements such as the analog conditioning circuit 54, the power supply 56 and the detection circuit may be included in the FCI 52, it is contemplated that the detection circuit may be included in the FCI 52 while the remaining FCI elements may be included in a separate external box. In yet another configuration, the detection circuit may be included in the FCI 52 while the remaining FCI elements, except the remote display, may be included in a separate external box.

During typical FCI operation, the first microcontroller 62 receives monitored current signals 63, indicative of currents in the monitored electrical conductors, from the detection circuit 64. When a fault condition is detected (e.g., monitored current signal exceeds a threshold), the FCI microcontroller 62 causes an indication of the fault (i.e., an optical FCI status) to be displayed via the first LED 60. The FCI microcontroller 62 also sends commands to the detection circuit 64. In the illustrated example, copper wire is used to enable transmission between the FCI microcontroller 62 and the detection circuit 64; however other suitable transmission media may be utilized. Similarly, communication between the FCI microcontroller 62 and the first LED 60 is enabled using copper wire; however other suitable transmission media may be utilized. Although only one FCI 52 is included in the enclosure 32, it is contemplated that additional FCIs, configured and operational as the FCI 52, may also be included.

As mentioned above, the FCI 52 generally requires FCI resetting, testing and other maintenance activities to be performed by utility personnel 66. Referring again to FIG. 2, a user command tool 74 is also included in the system 50 to enable an optical serial communication 61 to be provide to the FCI 52 via the first LED 60 while the utility personnel 66, holding the user command tool 74, is located outside of the enclosure 32. Such an optical serial communication 61 may include, for example, data or a command, in the form of a pattern such as a repetitive serial pattern, useable by the FCI microcontroller 62 to perform FCI resetting, testing and other maintenance activities.

In an embodiment, the FCI microcontroller 62 includes a Texas Instruments MSP430 microprocessor operatively coupled to a suitable memory means of the FCI microcontroller 62. As will be appreciated by one skilled in the art, other types of FCI microprocessors may be used. For reasons discussed below, the microprocessor is preferably configured to remain in a sleep-mode, or low-power mode, until it receives an indication of the optical serial communication 61 or until it is called upon to perform a task (e.g., cause the first LED 60 to flash). For example, if the microprocessor is used in conjunction with a low-power crystal oscillator, a serial port of the microprocessor can receive an incoming serial digital signal representative of the optical serial communication 61 while in the sleep-mode. Upon receipt of the optical serial communication 61 signal however, a microprocessor-interrupt signal will activate to enable the optical serial communication 61 to be interpreted.

Error detection and software control of the microprocessor-interrupt signal is also preferably included.

As illustrated in FIG. 2, the user command tool 74 includes a tool microcontroller 68 operatively coupled to a second LED 70 and a power supply 72. Although not separately shown, the tool microcontroller 68 includes a microprocessor and a memory operatively coupled to the microprocessor of the tool microcontroller 68. In an embodiment, the user command tool 74 also includes an on/off means 76 configured to enable the utility personnel 66 to initiate or terminate operation of the user command tool 74. Accordingly, the on/off means 76 may be one of a binary test switch, a push button, a membrane switch, a switch actuator, to name a few.

In order to provide an accurate optical serial communication 61 to the LED 54, a tight physical connection is preferred between the user command tool 74 and the remote display bolt 58. This tight physical connection minimizes a possibility of ambient light reaching the first LED 60, and may be accomplished in one of any number of ways. For example, a transmitting end of the user command tool 74 may be configured in a concave manner to enable substantially precise mating with the convex shape of the remote display bolt 58.

The user command tool 74 may be configured in one of any number of suitable configurations. For example, placement of the on/off means 76 may vary, depending on the preferred design of the user command tool 74. In an embodiment, the on/off means 76 may be a switch actuator located at the transmitting end of the user command tool 74 such that when the user command tool 74 is coupled to the remote display bolt 58, the switch actuator will automatically depress to enable transmission of the optical serial communication 61.

FIG. 3 is a diagram of an exemplary user command tool 78 that may be used to communicate with the FCI 52, according to an embodiment of the invention. As illustrated in FIG. 3, it includes the on/off means 76 disposed in the transmitting end, and a connector 80 configured to communicate with an intelligent computing device such as a laptop computer. The connector 80 may be configured as a serial port, a universal serial bus, or an RF transceiver arrangement such as a Bluetooth transceiver, to name a few.

When connected to the intelligent computing device, the user command tool 78 may be programmed to reconfigure the operational parameters of the FCI 52 such as, for example, a display time-out duration parameter and/or a fault level threshold parameter. The user command tool 78 may also be programmed to activate or deactivate operation features of the FCI 52 such as activation/deactivation of inrush restraint functionality or activation/deactivation of timed reset functionality.

FIG. 4 is a diagram of another exemplary user command tool 82 that may be used to communicate with the FCI 52, according to an embodiment of the invention. As illustrated in FIG. 4, a photosensor 84 is operatively coupled to the tool microcontroller 68, and configured to receive optical FCI status signals 67 from the FCI 52 via the first LED 60 (see, FIG. 2). Accordingly, when received by the photosensor 84, the optical FCI status signal 67 is utilized by the tool microcontroller 68 to, for example, receive data from the FCI 52 and/or to implement a serial communications protocol such as Xmodem. Subsequent transmission of the optical serial communication 61 from the user command tool 82 to the FCI 52 is then accomplished via the second LED 70. The connector 80 is also included to enable communication with an intelligent computing device.

FIG. 5 is a diagram of yet another exemplary user command tool 86 that may be used to communicate with the FCI 52, according to an embodiment of the invention. The user command tool 86 includes the second LED 70 configured to provide the optical serial communication 61, the photosensor 84 configured to receive the optical FCI status signals 67, and the on/off means 76, all operatively coupled to the tool microcontroller 58. Although not separately illustrated, any of the user command tools described above may include a charger adaptor to enable recharging of its power supply.

Figure 6:
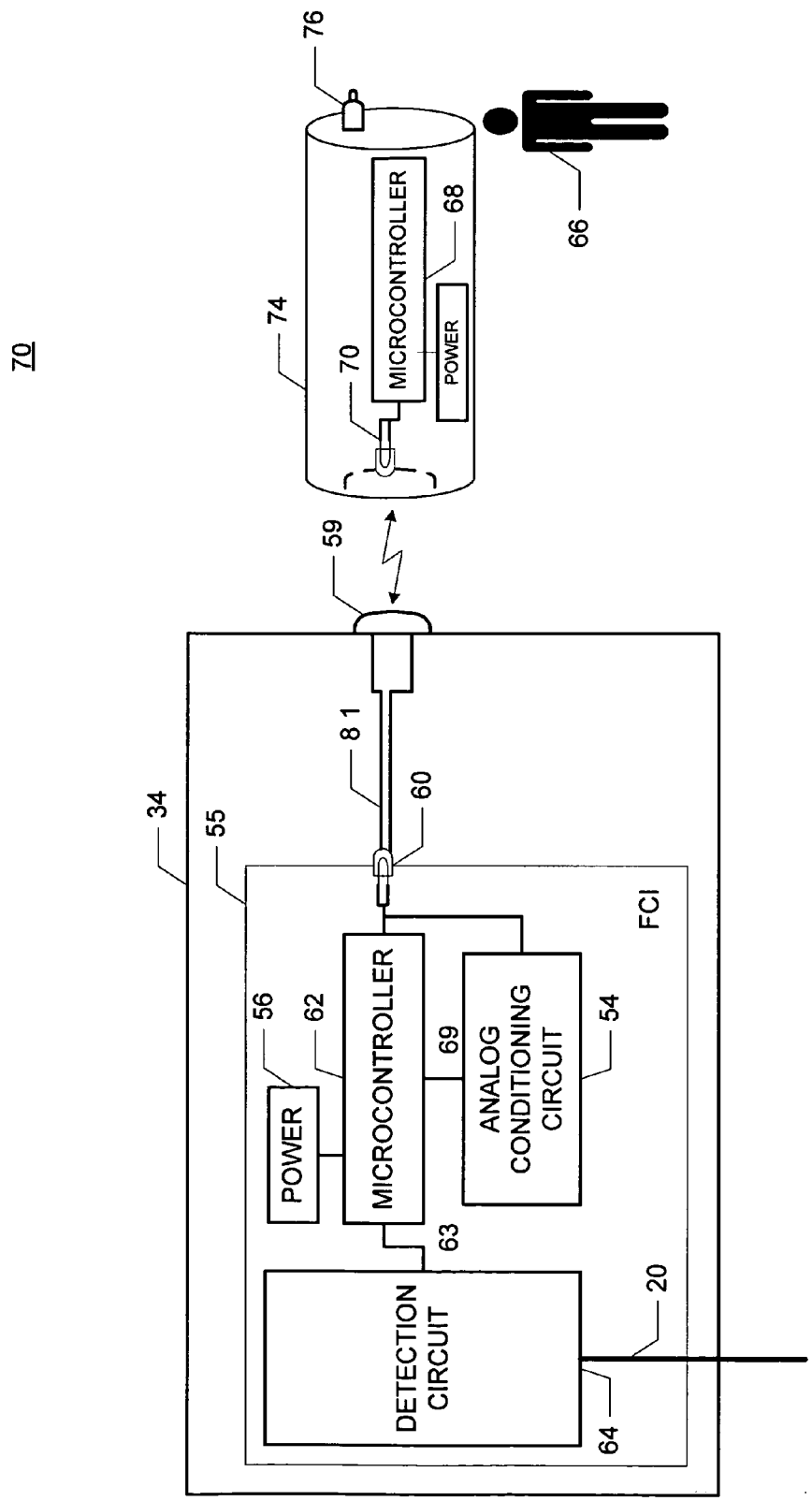
FIG. 6 is another exemplary system for communicating with a faulted circuit indicator located in an enclosure via a remote display, according to another embodiment of the invention.

As noted above, the elements of the FCI may be arranged in a number of ways. For example, FIG. 6 is another exemplary system 70 for communicating with the FCI via a remote display, according to another embodiment of the invention. Unlike the system 50 of FIG. 2, the system 70 of FIG. 6 utilizes a translucent remote display bolt 59 optically coupled to the first LED 60 via a fiber optic link 81. As illustrated, the first LED 60 is directly coupled to the FCI microcontroller 62. Like the remote display bolt 58, the translucent remote display bolt 59 is preferably a bolt designed to fit into a smaller diameter hole (e.g., a 7/16" hole) in a suitable wall of the enclosure 34. Construction of the translucent remote display bolt 59 may also include the use of a metal injection molded stainless steel core with a translucent cover and a polycarbonate overmold.

During operation, the translucent remote display bolt 59 enables indirect transmission of the optical serial communication 61 from the user command tool 74 to the first LED 60. Similarly, the translucent remote display bolt 59 enables indirect transmission of the optical FCI status signal 67 to the second LED 70 (or photosensor 84) of the user command tool 74.

Referring again to FIG. 2, during FCI resetting, testing and other maintenance activities, the user command tool 74 is tightly optically coupled to the remote display bolt 58. The optical serial communication 61 is transmitted via the second LED 70 from the user command tool 74 to the first LED 60. In addition to providing test activation and reset functionality, the user command tool 74 may be adapted to perform many activities. For example, the optical serial communication 61 may be a repetitive optical serial communication which, when converted into the serial digital signal 69 and received by the FCI microcontroller 62, provides operational instructions for the FCI 52. Such operational instructions may configure FCI features such as inrush restraint on/off, timed reset of LED on/off, and delay trip settings (e.g., 1, 8, 16, 24, or 48 milliseconds), to name a few. The operational instructions may also cause the FCI 52 to record selected data, transferable to an intelligent computing device via a suitably configured connector of the user command tool 74 (see, FIGS. 3 and 4). The optical serial communication 61 may also provide data to the FCI 52 such as time and date for accurate data logging.

Upon receipt by the first LED 60, the optical serial communication 61 is converted into a corresponding serial voltage signal 65 which is subsequently received by the analog conditioning circuit 54 and conditioned to form the serial digital signal 69 suitable for use by the FCI microcontroller 62. The analog conditioning circuit 54 includes circuitry to generate the serial digital signal 69, representative of the optical serial communication 61.

In general, when received, the serial digital signal 69 may cause the first microcontroller 62 to exit sleep-mode and execute an instruction such as a test-activate instruction for testing FCI power supply status, or a reset instruction for terminating an LED illumination sequence for fault display.

During the LED flash pattern indicating a fault condition (e.g., trip mode) the FCI microcontroller 62 repeatedly transitions between a sleep-mode and an active-mode; that is the microcontroller 62 transition from sleep-mode to active-mode to cause an LED flash, and then transitions back to sleep-mode during an inactive period between the LED flashes. During the inactive period of the LED flash pattern, the microcontroller 62 can again transition to active-mode to receive the serial digital signal 69; otherwise, the microcontroller 62 will receive the serial digital signal 69 without interruption. The selective interrupt capability allows the microcontroller 62 to stop execution of a command when a new instruction to do so is received. For example, if the microprocessor of the first microcontroller 62 is executing an instruction to repeatedly flash the first LED 60, this instruction to flash may be interrupted if another instruction is received to terminate flashing of the first LED 60.

Figure 7:
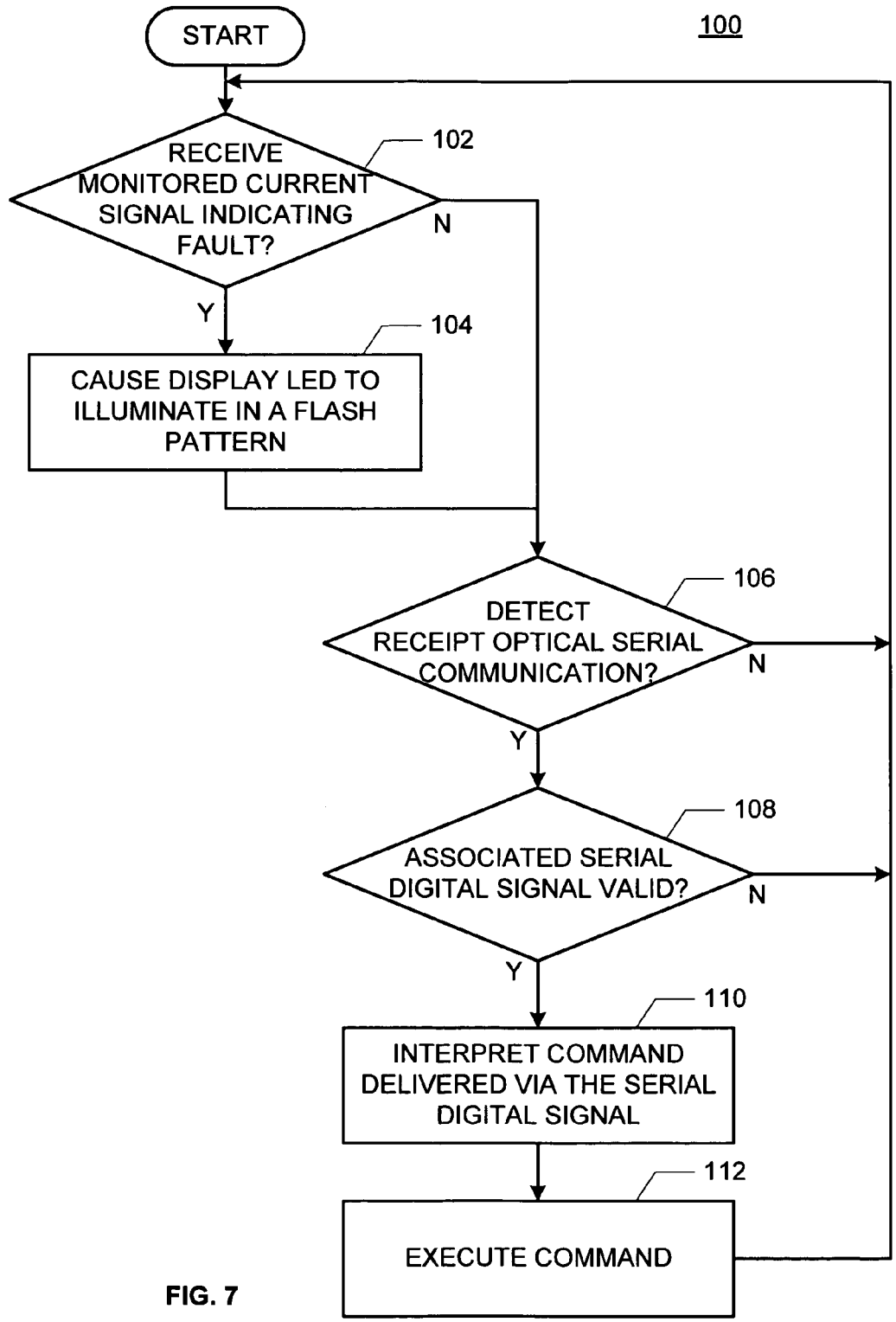
FIG. 7 is a flowchart of a method for communicating with a faulted circuit indicator via a remote display using the circuit assembly of FIG. 2, according to an embodiment of the invention.

FIG. 7 is a flow chart of a method 100 for communicating with an FCI via a remote display using a user command tool, according to an embodiment of the invention. Referring also to FIG. 2, the method 100 enables the utility personnel 66 with the user command tool 74 to communicate with the FCI 62 via the remote display 58. Referring to FIGS. 7 and 2, if a monitored current signal 63 from the detection circuit 64 indicates a trip condition, for example, a current in the monitored electrical conductor has exceeded a threshold value (step 102), the FCI microcontroller 62 causes the first LED 60 to illuminate in a flash pattern (step 104). The flash pattern may be steady or may be intermittent and generally continues for a predetermined time period such as, for example, eight hours to ensure that utility personnel 66 are aware of the trip condition. During the predetermined time period, illumination in a flash pattern of the first LED 60 requires power, albeit a "small" amount, from the power supply 56. Thus, it is advantageous for utility personnel 66, using the user command tool 74, to reset the FCI 52 as soon as possible and cancel out the remaining illumination time and conserve power usage.

When the first LED is not illuminating, upon detecting coupling of the user command tool 74 to the remote display 58 via the optical serial communication 61, the FCI microcontroller 62 transitions from the sleep-mode to the active-mode to enable receipt of the serial digital signal 69 representative of the optical serial communication 61 (step 106). In that case, the user command tool 74 may be used to determine if the power supply 56 is working, to change FCI settings such as trip time and LED illumination time, or to enable, disable or modify FCI parameters, to name a few.

When FCI microcontroller 62 detects receipt of the optical serial communication 61 from the user command tool 74 and the first LED 60 is flashing, during the inactive period of the LED flash pattern, the microcontroller 62 will transition to the active-mode to receive the serial digital signal 69 between flashes. In that case, the user command tool 74 may be used to cancel out the remaining illumination time of the first LED 60 and to enable the FCI 52 to respond to the detection circuit 64.

Referring again to FIG. 7, when the FCI microcontroller 62 detects receipt of the optical serial communication 61 from the user command tool 74, the associated serial digital signal 69 is "interrogated" by the microcontroller 62 for validity purposes in order to protect against inadvertently received signals such as ambient lights from a passing car. If the serial digital signal 69 is determined to be valid (step 108), the microcontroller 62 interprets the command delivered via the serial digital signal 69 (step 110) and will then act in response to the command delivered via the serial digital signal 69 (step 112). Such commands may include, for example, a reset command and a test-activate command. As will be appreciated by one of ordinary skill in the art, validity of the serial digital signal 69 may be determined in one of any number of ways such as encoding the optical serial communication 61 using one of a variety of encoding methods.

While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

What is claimed is:

1. A system for communicating with a faulted circuit indicator (FCI), the system comprising:
   a faulted circuit indicator including a detection circuit for monitoring an electrical conductor of a power system;
   a remote display mounted in a wall of an enclosure and visible from outside of the enclosure;
   a first light emitting diode associated with the remote display, the first light emitting diode generating an optical FCI status signal in response to an occurrence of a fault in the electrical conductor;
   a first microcontroller operatively coupled to the remote display and the detection circuit; and
   a handheld user command tool adapted to optically couple with the remote display and generate an optical serial communication, the optical serial communication providing data and commands for operation of the faulted circuit indicator.

2. The system of claim 1, further comprising an analog conditioning circuit operatively coupled to the remote display and the first microcontroller, the analog conditioning circuit configured to convert a serial voltage signal into a serial digital signal received by the first microcontroller, the serial voltage signal generated by the first light emitting diode in response to receipt of the optical serial communication.

3. The system of claim 1, wherein the optical FCI status signal comprises a flashing illumination pattern.

4. The system of claim 2, wherein the first microprocessor and a memory means operatively coupled to the first microprocessor, the first microprocessor having interrupt functionality to enable receipt of the serial digital signal between illuminations of the flashing illumination pattern.

5. The system of claim 2, further comprising a first power supply operatively coupled to the first microcontroller, the remote display, the detection circuit and the analog conditioning circuit.

6. The system of claim 5, wherein the faulted circuit indicator includes the detection circuit, the first microcontroller, the analog conditioning circuit and the first power supply.

7. The system of claim 1, wherein the light emitting diode is further adapted to provide the FCI optical status signal when the monitored current signal exceeds a trip threshold setting.

8. The system of claim 1, wherein the remote display further comprises a bolt configured to house the first light emitting diode and enable the optical FCI status signal to be visible from outside of the enclosure.

9. The system of claim 8, wherein the bolt is further configured to fit into a 7/16 inch diameter hole in the wall of the enclosure.

10. The system of claim 8, wherein the bolt comprises a convex head including a translucent material enabling transmission of the optical FCI status signal and enabling receipt of the optical serial communication.

11. The system of claim 8, wherein the bolt comprises a metal injection molded stainless steel core with a polycarbonate overmold.

12. The system of claim 1, wherein the remote display comprises a bolt having a translucent head, and wherein the remote display is optically coupled to the first light emitting diode to enable the optical FCI status signal to be detected from outside of the enclosure.

13. The system of claim 1, wherein the optical serial communication is encoded.

14. The system of claim 1, wherein the handheld user command tool comprises:
   a housing having a first end adapted for optical coupling with the remote display;
   a second light emitting diode disposed at the first end of the housing;
   an on/off means configured to enable and disable transmission of the optical serial communication;
   a second power supply operatively coupled to the second light emitting diode; and
   a second microcontroller operatively coupled to the second power supply, the second light emitting diode and the on/off means, the second microcontroller causing the second light emitting diode to generate the optical serial communication when an indication to enable transmission of the optical serial communication is received from the on/off means.

15. The system of claim 14, wherein the housing comprises a cylinder, and wherein a concave area is formed in the first end to enable the optical coupling with the remote display.

16. The system of claim 14, wherein the on/off means comprises a binary switch disposed on an outside portion of the handheld user command tool, a first position of the binary switch enabling transmission of the optical serial communication and a second position of the binary switch preventing transmission of the optical serial communication.

17. The system of claim 14, wherein the handheld user command tool further comprises a connector means, the connector means enabling communication between an intelligent computing device and the second microcontroller.

18. The system of claim 17, wherein the connector means is selected from the group consisting of a serial port, a parallel port and a universal serial bus connector.

19. The system of claim 14, wherein the handheld user command tool further comprises a transceiver assembly operatively coupled to the second microcontroller, the transceiver assembly enabling radio frequency communication between a radio frequency intelligent computing device and the second microcontroller.

20. The system of claim 14, wherein the handheld user command tool further comprises a photosensor disposed at the first end of the handheld user command tool and operatively coupled to the second microcontroller, the photosensor configured to receive illumination from the first light emitting diode.

21. The system of claim 20, wherein the handheld user command tool further comprises a connector means, the connector means enabling communication between an intelligent computing device and the second microcontroller.

22. The system of claim 21, wherein the connector means is selected from the group consisting of a serial port, a parallel port and a universal serial bus connector.

23. The system of claim 20, wherein the handheld user command tool further comprises a transceiver assembly operatively coupled to the second microcontroller, the transceiver assembly enabling radio frequency communication between a radio frequency intelligent computing device and the second microcontroller.

24. A handheld user command tool adapted to optically couple with a remote display, the handheld user tool comprising:
   a housing having a first end adapted for optical coupling with the remote display, the remote display comprising:
      association with a faulted circuit indicator monitoring an electrical conductor of a power system;
      a first light emitting diode; and,
      mounting in a wall of an enclosure housing the faulted circuit indicator;
   a second light emitting diode disposed at the first end of the housing;
   an on/off means disposed on an outside portion of the housing;
   a power supply operatively coupled to the second light emitting diode; and
   a microcontroller operatively coupled to the power supply, the second light emitting diode and the on/off means, the microcontroller causing the second light emitting diode to generate an optical serial communication when an indication to enable transmission of the optical serial communication is received from the on/off means,
   wherein the optical serial communication provides data and commands for operation of the faulted circuit indicator.

25. The handheld user command tool of claim 24, wherein the housing comprises a cylinder, and wherein a concave area is formed in the first end to enable the optical coupling with the remote display.

26. The handheld user command tool of claim 24, wherein the on/off means comprises a binary switch disposed on an outside portion of the handheld user command tool, a first position of the binary switch enabling transmission of the optical serial communication and a second position of the binary switch preventing transmission of the optical serial communication.

27. The handheld user command tool of claim 24, wherein the handheld user command tool further comprises a connector means, the connector means enabling communication between an intelligent computing device and the microcontroller.

28. The handheld user command tool of claim 27, wherein the connector means is selected from the group consisting of a serial port, a parallel port and a universal serial bus connector.

29. The handheld user command tool of claim 24, wherein the handheld user command tool further comprises a transceiver assembly operatively coupled to the microcontroller, the transceiver assembly enabling radio frequency communication between a radio frequency intelligent computing device and the microcontroller.

30. The handheld user command tool of claim 24, wherein the handheld user command tool further comprises a photosensor disposed at the first end of the handheld user command tool and operatively coupled to the microcontroller, the photosensor configured to receive illumination from the first light emitting diode of the remote display.

31. The handheld user command tool of claim 30, wherein the handheld user command tool further comprises a connector means, the connector means enabling communication between an intelligent computing device and the microcontroller.

32. The handheld user command tool of claim 31, wherein the connector means is selected from the group consisting of a serial port, a parallel port and a universal serial bus connector.

33. The handheld user command tool of claim 30, wherein the handheld user command tool further comprises a transceiver assembly operatively coupled to the microcontroller, the transceiver assembly enabling radio frequency communication between a radio frequency intelligent computing device and the microcontroller.

34. A method for communicating with a faulted circuit indicator, the method comprising:
  providing a handheld user command tool including a second light emitting diode, the handheld user command tool adapted to optically couple with a remote display and generate an optical serial communication via the second light emitting diode, the optical serial communication providing at least one command for operation of the faulted circuit indicator;
  detecting receipt of the optical serial communication from the faulted circuit indicator using the remote display operatively coupled to the faulted circuit indicator, the faulted circuit indicator housed in an enclosure and including a microcontroller, the remote display associated with a first light emitting diode and mounted in a wall of the enclosure;
  validating a serial digital signal, the serial digital signal formed by digitizing the optical serial command; and
  executing the at least one command represented by the serial digital signal.

35. The method of claim 34, wherein the handheld user command tool includes:
  a housing having a first end adapted for optical coupling with the remote display, the second light emitting diode dispose at the first end;
  an on/off means configured to enable and disable transmission of the optical serial communication; and
  a second microcontroller operatively coupled to the second light emitting diode and the on/off means, the second microcontroller causing the second light emitting diode to generate the optical serial communication when an indication to enable transmission of the optical serial communication is received from the on/off means.

36. A method for communicating with a faulted circuit indicator, the method comprising:
  providing a handheld user command tool including a second light emitting diode, the handheld user command tool adapted to optically couple with the remote display and generate an optical serial communication via the second light emitting diode, the optical serial communication providing data for operation of the faulted circuit indicator;
  detecting receipt of the optical serial communication from the faulted circuit indicator using the remote display operatively coupled to the faulted circuit indicator, the faulted circuit indicator housed in an enclosure and including a microcontroller, the remote display associated with a first light emitting diode and mounted in a wall of the enclosure;
  validating a serial digital signal, the serial digital signal formed by digitizing the optical serial command; and
  utilizing the data represented by the serial digital signal.

37. The method of claim 36, wherein the handheld user command tool includes:
  a housing having a first end adapted for optical coupling with the remote display, the second light emitting diode dispose at the first end;
  an on/off means configured to enable and disable transmission of the optical serial communication; and
  a second microcontroller operatively coupled to the second light emitting diode and the on/off means, the second microcontroller causing the second light emitting diode to generate the optical serial communication when an indication to enable transmission of the optical serial communication is received from the on/off means.

* * * * *